July 17, 1962  J. C. SWEENEY  3,044,765
CLAMPING MECHANISM
Filed April 6, 1959
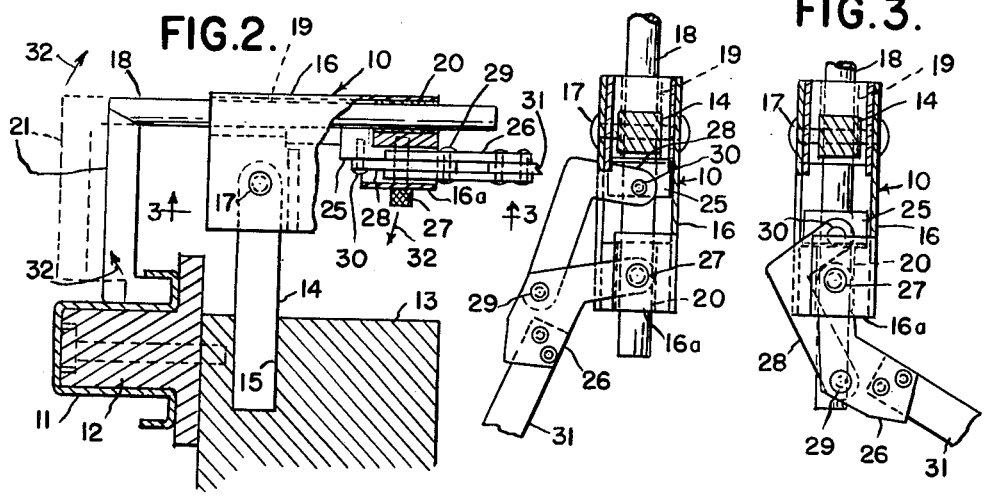
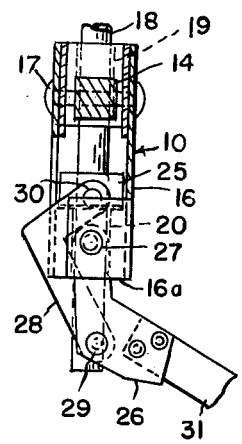
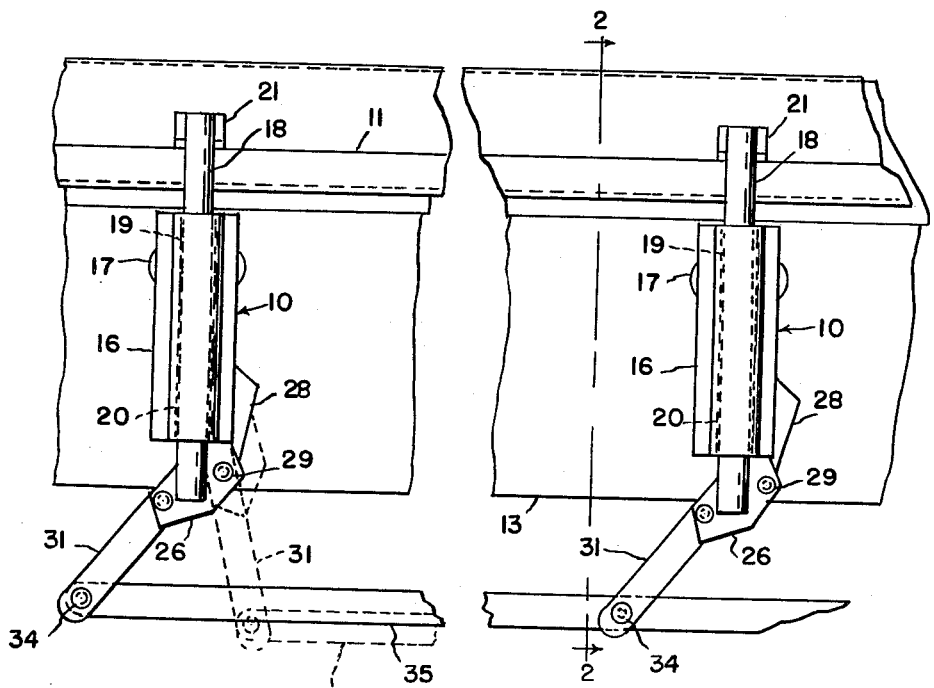
INVENTOR.
JAMES C. SWEENEY
BY
ATTORNEYS

United States Patent Office 3,044,765
Patented July 17, 1962

3,044,765
CLAMPING MECHANISM
James C. Sweeney, 5493 Middlebelt Road,
West Bloomfield, Mich.
Filed Apr. 6, 1959, Ser. No. 804,388
8 Claims. (Cl. 269—228)

My invention relates to clamping mechanisms such as those used in clamping a workpiece to a form or support, and more particularly to a mechanism operated by a continuous motion to first disengage the clamp and then move the entire mechanism out of the way of the workpiece.

For example, workpieces such as stringers and the like which are clamped over forms are generally difficult to remove from or insert on the forms because of the clamp, unless the clamp utilizes an action in which the clamp jaw travels a long distance away from the form. In certain cases particularly, where the workpiece has a complex shape and the clamp jaw fits into a recessed portion, the time spent inserting and removing the workpiece may be considerable, to say nothing of the possibility that the workpiece may be bent or scratched in trying to release it from the form and the clamp.

An object of the present invention is to solve the aforesaid difficulties by providing a clamping mechanism operable and hinged on axes disposed normal to each other such that the operator, in actuating a single handle, can both actuate the clamp mechanism and then pivot same away from the workpiece in one substantially continuous motion.

Another object of the invention is to simplify clamp operations by providing a plurality of clamping mechanisms each operable and pivoted on axes disposed normal to each other and connected in tandem for simultaneous actuation as indicated above.

A further object of the invention is to provide a simplified clamping mechanism as indicated above in which the working components are substantially shielded from foreign particles and protected from damage.

For a clear understanding of the invention, reference may be had to the accompanying drawing illustrating a preferred embodiment of the invention in which like reference characters refer to like parts throughout the several views and in which—

FIG. 1 is a top plan view of a pair of clamping mechanisms constructed and arranged in accordance with the present invention.

FIG. 2 is a side elevational view of one clamping mechanism as seen from line 2—2 of FIG. 1.

FIG. 3 is a fragmentary cross-sectional view of the clamping mechanism taken substantially on the line 3—3 of FIG. 2, and FIG. 4 is a fragmentary cross-sectional view similar to FIG. 3 but with the mechanism actuated to a different position.

As illustrated in FIGS. 1 and 2, a pair of clamping mechanisms 10 are arranged for clamping a preferred channel type stringer or workpiece 11 on a form 12 secured to a table 13 in any desirable manner.

Each clamping mechanism 10 comprises a supporting post 14 which is preferably mounted on the table 13 by insertion in a recess 15, and a housing 16 which is hinged to the upper end of the post 14 by any means such as a pivot pin 17, the pin 17 and the upper end of the post 14 preferably being enclosed and thus protected by the housing 16 as shown.

Clamping element or rod 18 is preferably slidably carried by spaced front and rear bushings 19 and 20 supported and enclosed in the housing 16. A clamping jaw element 21 is preferably welded to the front end of the rod 18, extending down and rearward to engage with the workpiece 11 as illustrated in FIG. 2.

A stop element 25 is secured to the bottom side of the rod 18 and can move back and forth between the bushings 19 and 20 inside the housing 16, being moved by means of an actuating mechanism comprising a two-part arm 26 pivotally secured to a lower portion 16a of the housing 16 by any means such as a bolt 27 on an axis disposed normal to the axis of the hinge pivot pin 17 connecting the housing 16 to the post 14, and a second angle-arm 28 pivotally connected to the arm 26 by any means such as a rivet 29 and to the stop element 25 by any means such as a screw 30.

A handle 31 is preferably riveted to the arm 26 as shown. The action of the mechanism is illustrated in FIGS. 3 and 4. In FIG. 3, the arm 26 has been pivoted so as to move the other arm 28 to an over-center position, retracting the rod 18 so that the clamping jaw element 21, as shown in FIG. 2, is pulled back to clamp the workpiece 11 firmly on the form 12. The over-center provision serves to lock the clamp in position. In FIG. 4, the arm 26 has been pivoted in the other direction so as to shift the arm 28 forward, extending the rod 18 to disengage the clamping jaw element 21 from the workpiece, as indicated by the dotted line position shown in FIG. 2.

After the clamp has been disengaged, the operator, in a substantially continuous motion, moves the handle 31 downward to pivot the housing 16 and the mechansim carried thereby in the direction indicated by the directional arrows 32 of FIG. 2, completely removing the clamping jaw element 21 from interference with the workpiece 11 which may then be readily removed from the form 12.

It will be apparent that this operation is made possible only by virtue of having disposed the axis of the bolt 27, on which the actuating arm 26 pivots, normal to the axis of the hinge pin 17, so that actuation of the actuating mechanism will not tend to effect pivoting on the pin 17 and pivoting on the pin 17 will not tend to effect actuation of the clamping mechanism, yet both motions are controlled by movement of the handle 31 by the operator.

Moreover, the present construction and arrangement permits the installation of a plurality of clamping mechanisms 10 in tandem as shown in FIG. 1, for use where long workpieces 11 must be clamped at a plurality of points. All that is necessary here is that the hinge pins 17 be disposed on a common axis and that the arms 26 be pivoted on axes disposed in a common plane extending parallel to the axis of the hinge pins 17, such that the handles 31 can be connected with pivot pins 34 for simultaneous opeartion by means of an operating bar 35. The operator, by simply operating the bar 35 laterablly and up or down with a substantially continuous motion, can actuate and pivot as many clamping mechanisms 10 as are connected to the bar 35.

Also, it will be seen that the present construction permits the housing 16 to cover and enclose both the hinge pin 17 and the operating mechanism to substantially prevent foreign material from clogging the working parts and also protect same from damage, in addition to providing for support of the movable rod 18 by the widely spaced bushings 19 and 20.

Although I have described only one preferred embodiment of the invention, it will be apparent to one skilled in the art to which the invention pertains that various changes and modifications may be made therein without departing from the spirit of the invention or the scope of the appended claims.

I claim:
1. A clamping mechanism comprising a support, a clamp assembly, and hinge means connecting said assembly to said support, said clamp assembly having a mov- able clamp element and means actuating same, said actuating means being pivotally operable on an axis disposed normal with respect to the axis of said hinge means, whereby motions actuating said clamp element are in planes normal to the axis of said hinge means and motions pivoting said clamp assembly on the axis of said hinge means are in planes normal to the axis of said clamp element actuating means.

2. The clamping mechanism as in claim 1 and in which said actuating means is operable to axially move said clamp element in a direction normal to the axis of said hinge means.

3. The clamping mechanism as in claim 1 and in which said actuating means is operable to axially move said clamp element in a direction normal to the axis of said hinge means and normal to the pivot axis of said actuating means.

4. A clamping mechanism comprising a support, a plurality of spaced clamp assemblies, and hinge means connecting said assemblies to said support on a common hinge axis, each clamp assembly having a movable clamp element and means actuating same, said actuating means being pivotally operable on axes disposed normal with respect to said hinge axis and lying in a common plane extending parallel with said hinge axis, and a common handle connected with said actuating means, whereby motions of said handle operating to actuate said clamp elements are in planes normal to said hinge axis and motions of said handle operating to pivot said clamp assemblies on said hinge axis are in planes normal to the axes of said clamp element actuating means.

5. The clamping mechanism as in claim 4 and in which said actuating means are simultaneously operable to axially move said clamp elements in directions normal to said hinge axis.

6. The clamping mechanism as in claim 5 and in which the axes of said clamp elements are disposed in a common plane extending parallel with said hinge axis and normal to the common plane containing said actuating means pivot axes.

7. A clamping mechanism comprising a support and a clamp assembly overlying said support, said support having a substantially vertical mounting post, said clamp assembly comprising a housing disposed above said mounting post and encasing the upper end thereof, hinge means connecting said housing with the upper end of said mounting post and enclosed in said housing, a clamp element axially movably carried by said housing, actuating means pivotally carried by said housing on an axis disposed normal with respect to the axis of said hinge means, and said actuating means being operably connected with said clamp element, whereby motions actuating said clamp element are in planes normal to the axis of said hinge means and motions pivoting said housing on the axis of said hinge means are normal to the axis of said clamp element actuating means.

8. The clamping mechanism as in claim 7 and in which said clamp element comprises a rod extending through said housing and overlying the connection with said actuating means, and said housing enclosing that portion of said rod connected with said actuating means for shielding the connection.

References Cited in the file of this patent
UNITED STATES PATENTS

| | | |
|---|---|---|
| 419,884 | Richards | Jan. 21, 1890 |
| 502,533 | Scales | Aug. 1, 1893 |
| 1,997,428 | Olson | Apr. 9, 1935 |
| 2,651,959 | Harrington | Sept. 15, 1953 |
| 2,787,826 | Aronson | Apr. 9, 1957 |